United States Patent
Stausberg

(10) Patent No.: US 11,471,795 B2
(45) Date of Patent: Oct. 18, 2022

(54) HYDRAULIC OIL FILTER SYSTEM FOR A MOTOR VEHICLE TRANSMISSION

(71) Applicant: IBS FILTRAN KUNSTSTOFF-/ METALLERZEUGNISSE GMBH, Morsbach (DE)

(72) Inventor: Wolfgang Stausberg, Morsbach (DE)

(73) Assignee: IBS FILTRAN KUNSTSTOFF-/ METALLERZEUGNISSE GMBH, Morsbach (DE)

( * ) Notice: Subject to any disclaimer, the term of this patent is extended or adjusted under 35 U.S.C. 154(b) by 1095 days.

(21) Appl. No.: 15/999,539

(22) PCT Filed: Feb. 2, 2017

(86) PCT No.: PCT/EP2017/052190
§ 371 (c)(1),
(2) Date: Aug. 20, 2018

(87) PCT Pub. No.: WO2017/140503
PCT Pub. Date: Aug. 24, 2017

(65) Prior Publication Data
US 2021/0199188 A1    Jul. 1, 2021

(30) Foreign Application Priority Data
Feb. 19, 2016  (DE) .................... 10 2016 202 625.9

(51) Int. Cl.
*B01D 27/10*    (2006.01)
*F16H 61/00*    (2006.01)
(Continued)

(52) U.S. Cl.
CPC ......... *B01D 27/103* (2013.01); *B01D 35/147* (2013.01); *B01D 35/153* (2013.01);
(Continued)

(58) Field of Classification Search
CPC .............. F15B 21/041; F15B 2211/615; F15B 2211/30505; F15B 13/027; F15B 13/0401;
(Continued)

(56) References Cited

U.S. PATENT DOCUMENTS 4,126,553 A * 11/1978 Berg .................... B01D 35/147
                                                   210/172.1
6,708,665 B1   3/2004 Lehmann
(Continued)

FOREIGN PATENT DOCUMENTS

DE         19942543        3/2001
DE         19950052        5/2001
(Continued)

OTHER PUBLICATIONS

English translation of Office Action from corresponding Korean Appln. No. 10-2018-7027076 dated Oct. 26, 2018.
(Continued)

*Primary Examiner* — Atif H Chaudry
(74) *Attorney, Agent, or Firm* — Grossman, Tucker, Perreault & Pfleger, PLLC

(57) ABSTRACT

The invention relates to a pressure oil filter system for a hydraulic transmission, in particular for a motor vehicle transmission, comprising at least one oil pump which can be actuated as required and which has a pressure side and a suction side, a pressure line to a consumer and at least a first oil filter which is arranged at the pressure side of the oil pump in the pressure line, wherein means for damping pressure surges during intermittent operation of the oil pump are provided in the pressure line upstream of the first oil filter in the flow direction of the oil.

4 Claims, 4 Drawing Sheets

(51) Int. Cl.
*F16K 15/02* (2006.01)
*F15B 21/041* (2019.01)
*F15B 13/04* (2006.01)
*F15B 13/02* (2006.01)
*F16H 57/04* (2010.01)
*B01D 35/147* (2006.01)
*B01D 35/153* (2006.01)
*B01D 35/157* (2006.01)
*F16N 39/06* (2006.01)
*F01M 1/10* (2006.01)
*F16N 39/00* (2006.01)

(52) U.S. Cl.
CPC ........ *B01D 35/1573* (2013.01); *F15B 13/027* (2013.01); *F15B 13/0401* (2013.01); *F15B 21/041* (2013.01); *F16H 57/0402* (2013.01); *F16H 61/0031* (2013.01); *F16K 15/023* (2013.01); *F16N 39/06* (2013.01); *F01M 2001/1007* (2013.01); *F01M 2001/1085* (2013.01); *F01M 2001/1092* (2013.01); *F15B 2211/30505* (2013.01); *F15B 2211/615* (2013.01); *F16H 57/0435* (2013.01); *F16H 57/0436* (2013.01); *F16N 2039/007* (2013.01)

(58) Field of Classification Search
CPC ... F01M 2001/1007; F01M 2001/1085; F01M 2001/1092; F16H 57/0404; F16H 57/0435; F16H 57/0402; F16N 39/06; F16N 2039/007; B01D 35/147; B01D 35/153; B01D 35/157; B01D 35/1573; F16K 15/023
See application file for complete search history.

(56) References Cited

U.S. PATENT DOCUMENTS

| | | | |
|---|---|---|---|
| 8,915,343 | B2 | 12/2014 | Moorman et al. |
| 9,581,177 | B2 | 2/2017 | Schuller et al. |
| 9,702,381 | B2 | 7/2017 | Morita et al. |
| 9,909,715 | B2 | 3/2018 | Craft et al. |
| 2005/0132701 | A1* | 6/2005 | Rose ................ F15B 1/027 60/413 |
| 2011/0120568 | A1 | 5/2011 | Borntraeger et al. |
| 2011/0209470 | A1* | 9/2011 | Dougan ............ F16H 61/0021 60/494 |
| 2013/0270723 | A1* | 10/2013 | Grotheim ............ C10G 31/09 261/112.1 |

FOREIGN PATENT DOCUMENTS

| | | |
|---|---|---|
| DE | 102008040667 | 1/2010 |
| DE | 102011119702 | 6/2012 |
| DE | 102011100803 | 11/2012 |
| DE | 102012109336 | 4/2013 |
| JP | 2015-86883 | 5/2015 |
| KR | 2019990030325 | 12/2001 |

OTHER PUBLICATIONS

English translation of International Search Report from corresponding PCT Appln No. PCT/EP2017/052190 dated May 10, 2017.

\* cited by examiner

HYDRAULIC OIL FILTER SYSTEM FOR A MOTOR VEHICLE TRANSMISSION

FIELD

The invention relates to a pressure oil filter system for a hydraulic transmission, in particular for a motor vehicle transmission and a motor vehicle transmission having at least one electric oil pump which can be actuated when the engine is switched off.

BACKGROUND

Electrically operated oil pumps are increasingly being used in motor vehicle transmissions since they can be controlled in accordance with requirements in order to thus improve the degree of efficiency of the transmission.

Furthermore, it is also necessary with modern motor vehicles having an automatic start/stop system to maintain the transmission oil circuit when the internal combustion engine is switched off.

Furthermore, the operating portion of a pressure oil system on motor vehicle transmissions may comprise hydraulic actuation elements of a motor vehicle, control cylinders, etcetera, which have to be supplied at a specific constant pressure.

Generally, pressure oil systems comprise at the pressure side of the oil pump or the oil delivery pump oil filters which with a continuous throughflow clean the oil flow and keep fine particles from the oil flow. In this instance, the number of fine particles in the oil volume flow falls over the time of a continuous operating period of the system.

In motor vehicles with an automatic start/stop system, there are provided pressure oil systems which comprise an electrically actuatable oil pump. During start/stop operation of the motor vehicle, there is produced a pulse-like actuation of the electric oil pump which is necessary in order to accordingly maintain the operating pressure of the transmission oil in a timely manner. Tests with such pressure oil systems have shown that with a continuous filtration of the transmission oil the number of particles suspended in the oil also continuously decreases so that over the operating time of the internal combustion engine a satisfactory cleaning of the oil volume flow is achieved.

However, it has been found that with start/stop operation of the vehicle and consequently during intermittent operation of the electrically actuatable oil pump, which brings about a rapid pressure increase and an abrupt increase of the oil volume flow, a substantial increase of the particle numbers in the oil volume flow could be seen.

This can in principle be counteracted by a multi-stage and/or finer filtration. However, the use of a finer filter medium has the disadvantage that the oil filter produces greater pressure losses in the system.

SUMMARY

An object of the invention is therefore to provide a pressure oil filter system of the type mentioned in the introduction which, in spite of intermittent operation of an electrically actuatable oil pump, enables an effective fine and extremely fine filtration of the oil volume flow.

According to one aspect of the invention, a pressure oil filter system for a motor vehicle transmission is provided, comprising at least one preferably electric oil pump which can be actuated as required and which has a pressure side and an suction side, a pressure line to a consumer and at least a first oil filter which is arranged at the pressure side of the oil pump in the pressure line, wherein means for damping pressure surges during intermittent operation of the oil pump are provided in the pressure line upstream of the first oil filter in the flow direction of the oil.

The term "oil" used in this instance is intended in principle to be understood to generally include hydraulic fluids and in particular transmission oil fluids which are also known as so-called "ATF transmission oils".

The invention is based on the knowledge that, with a pulse-like actuation of the electric oil pump during operation of an automatic start/stop system of a motor vehicle, a highly pronounced cleaning of the particles received by the oil filter occurs. Such a pulse-like actuation of the electric oil pump is necessary in order approximately at the same time as the switching-off of the internal combustion engine to produce the operating pressure required for the transmission.

The Applicant has in an experimental set-up examined the cleaning behavior of different filter structures. In this instance, first a cleaning of the oil volume flow with continuous throughflow of the first oil filter was observed. Over the operating time of the internal combustion engine or over the duration of the oil filtration with a constant volume flow, there is in this instance a continuous decrease of the fine particles in the oil volume flow. When switching to the so-called pulse operation, that is to say, during intermittent operation of an actuatable oil pump, in contrast a significant increase of the number of particles in the oil volume flow was noted. This phenomenon according to the knowledge of the Applicant can be attributed to the fact that the pressure surges produced by the actuation of the oil pump on the oil filter together with a high acceleration of the oil volume flow result in the pressure surges mobilizing the particles deposited on the filter medium again. This phenomenon results, with relatively short intervals between the pressure surges, in a portion of the fine and extremely fine particles contained in the oil volume flow no longer being cleaned and being retained in suspension.

According to the invention, in order to solve this problem it is proposed that the pulse loading of the first oil filter or the filter medium be reduced in that means for damping pressure surges are provided in the pressure line upstream of the first oil filter in the flow direction of the oil.

Surprisingly, it has been found that an increase of the number of particles in the oil volume flow during intermittent operation of an electric oil pump can actually thereby be reduced so that on the whole lower oil cleaning classes are achieved.

This is particularly important against the background that in motor vehicles an increasingly complex mechatronics which places higher demands on the purity of the oil volume flow is installed.

The problem set out above and the solution proposed according to the invention in this context quite generally also relate to hydraulic controls and transmissions for other applications.

Another aspect of the invention relates to a pressure oil filter system which is distinguished in that a bridging line of the first oil filter is provided in the pressure line, in that at least a first pressure valve is arranged in the flow direction of the oil upstream of the first oil filter and downstream of a branch of the bridging line, in that at least a second pressure valve is arranged in the bridging line and in that the first pressure valve has a slow opening characteristic and the second pressure valve has a fast opening characteristic.

By means of the first pressure valve which is arranged in a pressure line to the first oil filter, a damping of pressure surges is advantageously brought about. In order to be able to supply a constant oil volume flow to the consumer in spite of the damping, there is provision according to the invention for a bridging line for the first oil filter to be provided, in which bridging line a second relatively rapidly opening pressure valve is arranged. A portion of the pressure pulse is thus transmitted via the bridging line so that a slight proportion of the oil volume flow is directed past the first oil filter. Tests with the arrangement according to the invention have confirmed that with this arrangement lower oil purity classes (DIN ISO 4406/99) can be achieved than with undamped intermittent operation of the oil pump.

According to the invention, in the direct supply line of the first oil filter there is provided as a first pressure valve a pulse protection valve which is configured in such a manner that the pressure flow produced by actuating the oil pump is already reduced directly before the valve member is opened. However, the second pressure valve in the bridging line is configured as a rapidly reacting valve so that the pressure surge produced by the oil pump being actuated is discharged via the bridging line.

The first pressure valve may, for example, be constructed as a damped non-return valve, whereas the second pressure valve may be constructed as a substantially undamped non-return valve.

Both pressure valves may, for example, be configured for an opening pressure between 0.5 and 1 bar.

In an advantageous variant of the pressure oil filter system according to the invention, there is provision for the opening pressure of the first pressure valve to be less than or equal to the opening pressure of the second pressure valve.

Advantageously, the damping characteristic of the first pressure valve can be adjusted so that the pressure oil system can be configured depending on the application. The first pressure valve may, for example, be hydraulically or mechanically damped. A hydraulic damping may, for example, be brought about by means of a piston which is connected to the valve member and which urges a volume into a compensation container.

If the first pressure valve is constructed with a resiliently loaded valve member which is retained in the closed position, the damping characteristic can be predetermined by the property of the spring. The spring may have a linear, progressive or degressive spring characteristic.

The pressure oil filter system according to the invention may, for example, comprise an oil reservoir, an actuatable preferably electric oil pump and a consumer in the form of a hydraulic control unit or a transmission.

The pressure oil filter system according to the invention advantageously comprises an oil reservoir, a pressure line to the consumer which is connected at the pressure side to the oil pump, a bridging line/bypass line and a return line into the oil reservoir.

Another aspect of the invention relates to a motor vehicle transmission having at least one preferably electric oil pump which can be actuated when the engine is switched off, having a pressure line which is connected at the pressure side to the oil pump, having at least a first oil filter which is arranged at the pressure side of the oil pump in the pressure line, having means for damping the pressure surge which is produced when the oil pump is actuated in the pressure line upstream of the oil filter in the flow direction of the oil.

Advantageously, a bridging line of the first oil filter may be provided in the pressure line, wherein at least a first pressure valve is arranged in the flow direction of the oil upstream of the first oil filter and downstream of a branch of the bridging line and wherein at least a second pressure valve is arranged in the bridging line and the first pressure valve has a slow opening characteristic and the second pressure valve has a fast opening characteristic.

Another aspect of the invention relates to a method for pressure oil filtration of an oil volume flow of a hydraulic transmission, in particular a motor vehicle transmission having a first preferably electric oil pump which has a pressure side and a suction side, having a pressure line and at least a first oil filter which is arranged at the pressure side of the oil pump in the pressure line, wherein the oil pump is operated intermittently and wherein a damping of the pressure oil volume flow is provided when the oil pump is actuated.

BRIEF DESCRIPTION OF THE DRAWINGS

The invention is described below with reference to an embodiment illustrated in the drawings.

DETAILED DESCRIPTION

Figure 1:
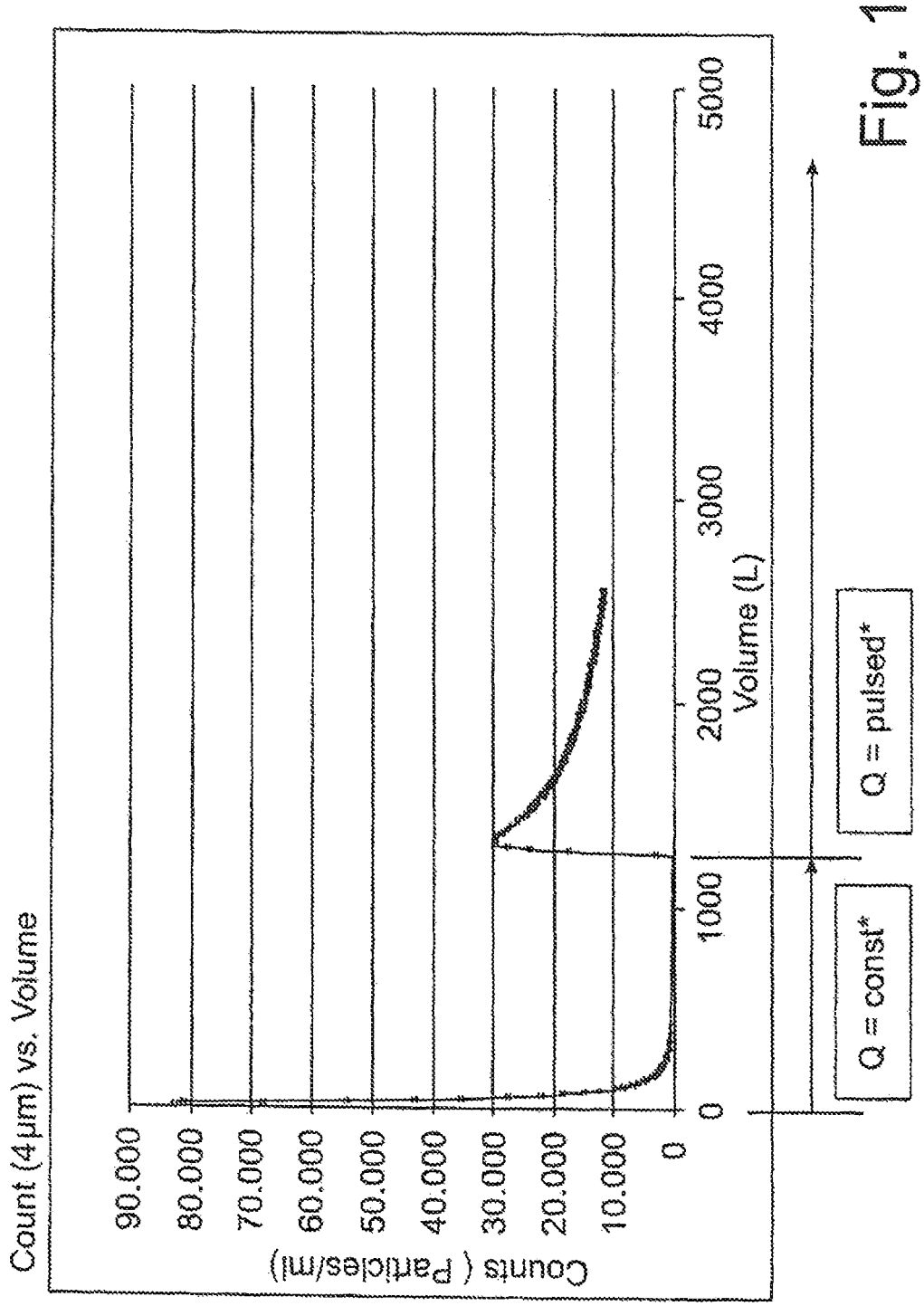
FIG. 1 is a graphic illustration of the number of particles in the oil volume flow, indicated over the filtered oil volume with continuous delivery of the oil volume flow and with pulsed delivery of the oil volume flow.

Reference is initially made to the illustration in FIG. 1 which illustrates the result of a simulated pulsed operation of a pressure oil filtration system with an electrically actuatable oil pump. There are indicated the number of particles in the oil volume flow with a diameter of approximately 4 µm over the filtered volume flow, that is to say, consequently over the duration of the filtration. As can be seen in the graph illustrated in FIG. 1, a constant operation of an oil pump over a constant oil volume flow is first provided as far as an overall volume of approximately 1,200 l. Then, an electrically operated oil pump is actuated, which brings about a pressure surge inside the system. The electric oil pump is arranged upstream of the first oil filter. The actuation of the electric oil pump brings about an abrupt increase of the number of particles in the oil volume flow and a subsequently slower decrease of the number of particles in the oil volume flow. Other switching operations of the intermittently operated electric oil pump are not illustrated in the graph.

Figure 2:
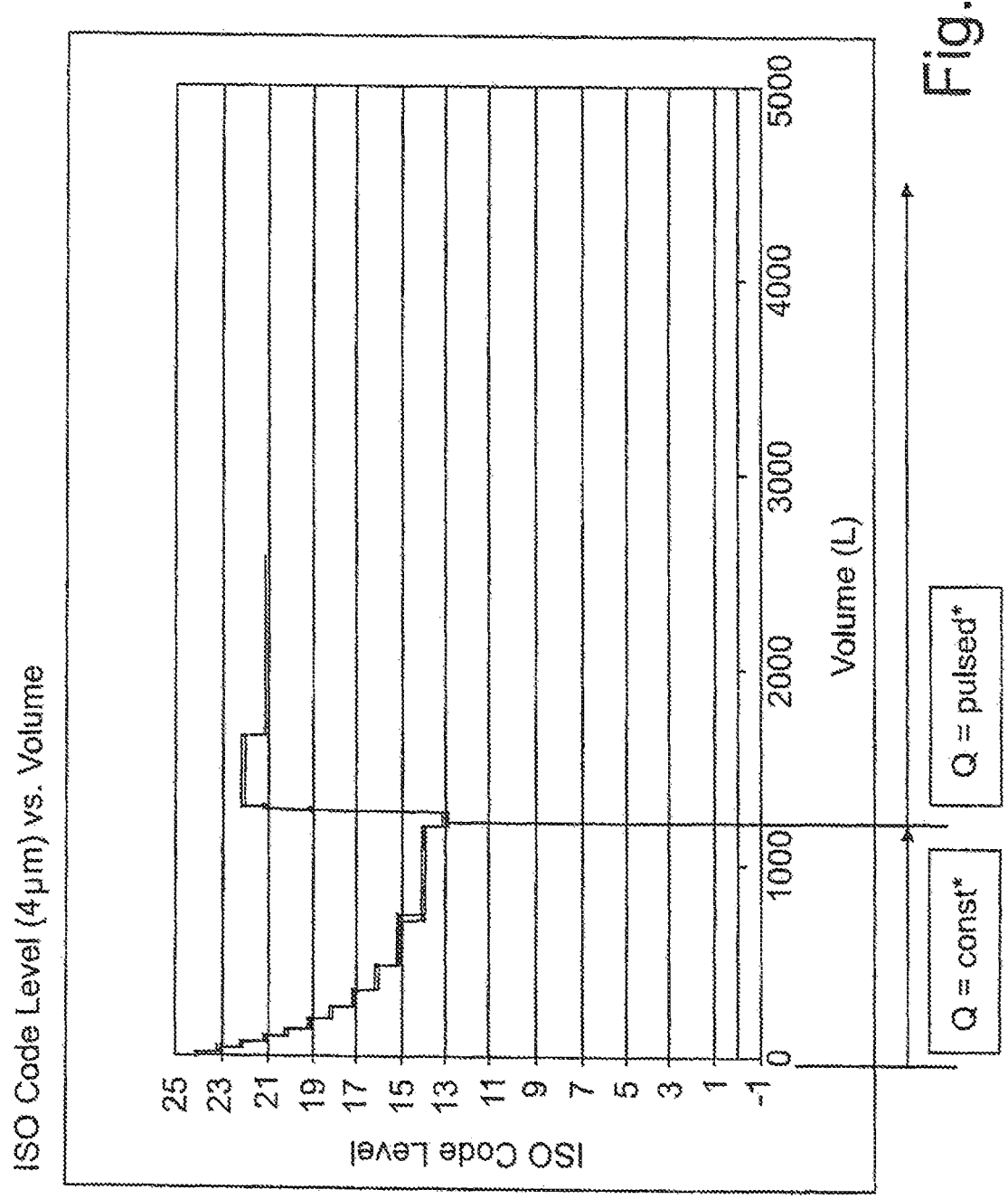
FIG. 2 is an illustration corresponding to FIG. 1, wherein the oil purity classes in accordance with DIN ISO are indicated over the filtered oil volume.

FIG. 2 shows the same simulation, but wherein in place of the number of particles, relative to the recirculated oil volume, the respective DIN ISO purity class is indicated.

Figure 3:
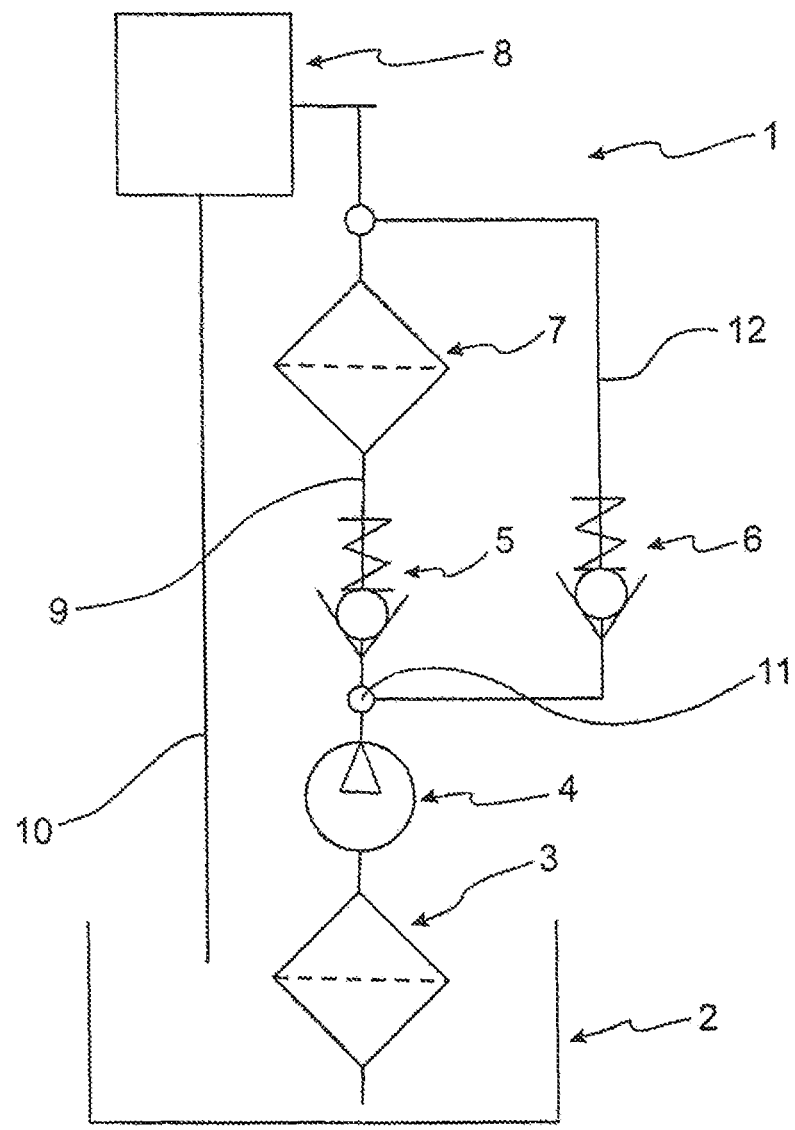
FIG. 3 is a hydraulic circuit diagram of a pressure oil filtration system according to the invention.

Reference is now made to FIG. 3, which shows a hydraulic plan of the pressure oil filter system 1 according to the invention. The pressure oil filter system 1 according to the invention comprises an oil reservoir 2 from which an oil pump 4, which is preferably constructed as an electric oil pump, draws in hydraulic fluid, for example, hydraulic oil. The oil pump 4 conveys the oil via a pressure line 9 to a consumer 8, for example, in the form of a control unit of a hydraulic transmission, for example, a motor vehicle transmission.

The oil is conveyed back into the oil reservoir 2 via a return line 10.

The oil pump 4 which is illustrated in the hydraulic plan is provided as an additional, actuatable oil pump.

If the consumer is, for example, a motor vehicle transmission or a control unit of a motor vehicle transmission, the oil circulation is additionally brought about by means of an oil pump which is driven by the internal combustion engine.

As a result of the actuation of the oil pump 4 which, for example, in the pressure line can bring about an oil conveying pressure between 4 and 6 bar, there are induced in the pressure line 9 a pressure surge and an abrupt volume increase, which acts on a first oil filter 7 which is provided in the pressure line 9. In this context, an oil filter arrangement having one or more filter media is referred to as a first oil filter.

In order to prevent the pressure surge which is brought about by the actuation of the oil pump 4 in the pressure line 9 resulting in a flushing of the first oil filter 7, there is provided according to the invention a so-called pulse protection valve circuit which comprises a first pressure valve 5 and a second pressure valve 6. The first pressure valve 5 is arranged in the flow direction of the oil upstream of the first oil filter 7 and downstream of a branch 11 of a bridging line 12 of the first oil filter 7. In the illustrated embodiment, both the first pressure valve 5 and the second pressure valve 6 are constructed as resiliently loaded non-return valves, wherein the first pressure valve 5 is constructed so as to open slowly and the second pressure valve 6 is constructed so as to open quickly or open rapidly. The first pressure valve 5 opens at an opening pressure between 0.5 and 1 bar and is constructed as a damped non-return valve, whereas the second pressure valve 6 also opens at a pressure between 0.5 and 1 bar and is substantially undamped.

In the event of a pressure surge induced by the oil pump 4 in the pressure line 9, the first pressure valve 5 opens in a delayed manner, whereas the second pressure valve 6 allows the pressure surge to pass. This pressure surge is guided via the bridging line 12 past the first oil filter 7 so that the pulse produced does not act directly on the filter medium provided in the first oil filter 7.

In the case of the illustrated embodiment, another suction filter 3 is arranged upstream of the suction side of the oil pump 4 as a second oil filter.

Figure 4:
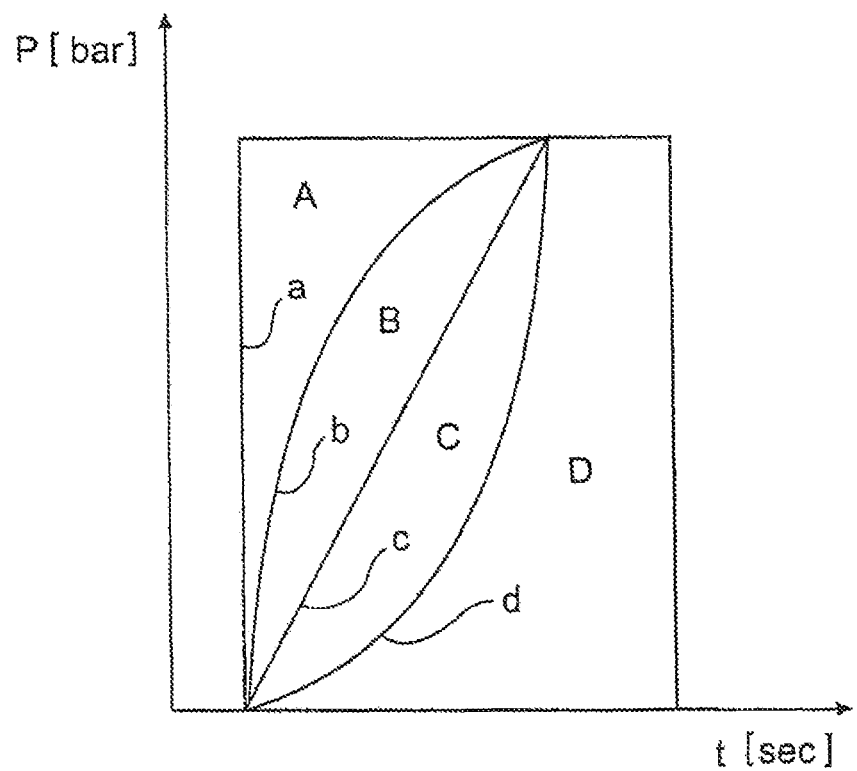
FIG. 4 is a schematic illustration of the pressure progression of the pressure oil volume flow indicated over time both for an ideally undamped pressure increase and for different damping characteristics.

Reference will now be made to FIG. 4, which shows different pressure progressions in the pressure line 9 for different damping characteristics.

The pressure progression which is designated a) is an ideally undamped pressure surge which produces a rectangular graph. The pressure progressions b), c) and d) each show a different progression in accordance with the adjusted damping characteristic of the first pressure valve 5. In this instance, the flank of the pressure increase extends differently, the portion of the lines which shows a constant pressure and a subsequent pressure drop is identical for all the valve characteristics.

The opening characteristic of the first pressure valve can be influenced both by means of a hydraulic damping of the valve member and in a mechanical manner. The lines b), c) and d) illustrated in FIG. 4 each show pressure increase lines, for example, for a progressive, linear or degressive spring characteristic of the spring of the first pressure valve 5.

LIST OF REFERENCE NUMERALS

1 Pressure oil filter system
2 Oil reservoir
3 Second oil filter
4 Oil pump
5 First pressure valve
6 Second pressure valve
7 First oil filter
8 Consumer
9 Pressure line
10 Non-return line
11 Branch
12 Bridging line

What is claimed is:

1. A pressure oil filter system for a hydraulic transmission, for a hydraulic control device or for the oil circuit of an internal combustion engine, comprising:
   at least one oil pump which can be actuated as required and which has a pressure side and a suction side,
   a pressure line to a consumer,
   at least a first oil filter which is arranged at the pressure side of the oil pump in the pressure line,
   at least a first pressure valve configured to damp pressure surges during intermittent operation of the oil pump is provided in the pressure line upstream of the first oil filter in the flow direction of the oil,
   a bridging line of the first oil filter provided in the pressure line,
   wherein the at least the first pressure valve is arranged in the flow direction of the oil upstream of the first oil filter and downstream of a branch of the bridging line,
   wherein at least a second pressure valve is arranged in the bridging line,
   wherein the first pressure valve has a slow opening characteristic and the second pressure valve has a fast opening characteristic,
   wherein the first pressure valve is constructed as a damped non-return valve, and
   wherein the second pressure valve is constructed as an undamped non-return valve.

2. The pressure oil filter system as claimed in claim 1, wherein the opening pressure of the first pressure valve is less than or equal to the opening pressure of the second pressure valve.

3. A motor vehicle transmission having a pressure oil filter system having the features of claim 1.

4. A method for pressure oil filtration of the oil volume flow of a hydraulic transmission, having an oil pump which can be actuated and which has a pressure side and a suction side, having a pressure line and at least a first oil filter which is arranged at the pressure side of the oil pump in the pressure line, wherein the oil pump is operated intermittently and wherein a damping of the pressure oil volume flow is provided when the oil pump is actuated, wherein a bridging line of the first oil filter is provided in the pressure line, in that at least a first pressure valve is arranged in the flow direction of the oil upstream of the first oil filter and downstream of a branch of the bridging line, in that at least a second pressure valve is arranged in the bridging line, in that the first pressure valve has a slow opening characteristic and the second pressure valve has a fast opening characteristic, wherein the first pressure valve is constructed as a damped non-return valve and wherein the second pressure valve is constructed as an undamped non-return valve.

* * * * *